United States Patent [19]

Hayes

[11] Patent Number: 5,067,094
[45] Date of Patent: Nov. 19, 1991

[54] QUANTIFYING ISOLATION VALVE LEAKAGE

[75] Inventor: James K. Hayes, Chattanooga, Tenn.

[73] Assignee: Combustion Engineering, Inc., Windsor, Conn.

[21] Appl. No.: 552,330

[22] Filed: Jul. 12, 1990

Related U.S. Application Data

[63] Continuation-in-part of Ser. No. 337,625, Apr. 13, 1989, abandoned.

[51] Int. Cl.⁵ ............................................. G01M 3/26
[52] U.S. Cl. .................................... 364/510; 364/509; 73/40; 73/46; 73/47; 374/4; 374/54; 340/605
[58] Field of Search ............... 364/509, 510; 340/603, 340/605, 606; 374/4, 54, 57; 73/40, 40.5 R, 46, 47, 49.5

[56] References Cited

U.S. PATENT DOCUMENTS

4,532,795 8/1985 Brayman et al. .................. 374/4
4,581,707 4/1986 Millar .............................. 364/509

Primary Examiner—Parshotam S. Lall
Assistant Examiner—Brian M. Mattson
Attorney, Agent, or Firm—Chilton, Alix & Van Kirk

[57] ABSTRACT

Valve leakage is quantified by measuring a variable that is commensurate with a heat transfer characteristic of the pipe wall (30) and comparing the measurements to data stored in a database (84) which embodies a quantitive relationship between an index commensurate with the heat transfer characteristic variable and a range of valve leakage rates that could occur for the given valve. In a straight forward implementation of the invention, a thermal hydraulic analysis of the specific valve and associated piping are performed a priori to establish a database of pipe wall temperature downstream of the valve as a function of steam flow rate. The wall temperature is simply measured and compared with the database. In another embodiment, an air cooled sleeve (54) is installed around the pipe (48) downstream of the valve (50) and a controlled flow of air is passed through the annulus (62) between the pipe and the sleeve. The temperature rise of the flowing air is measured and is used to compute the flow rate of steam leaking through the valve. In yet another embodiment, the valve leakage is quantified by controlling heat input into a local section of a horizontal pipe (94) upstream of the valve. The measured relation between heater power and pipe wall temperature is used with a database to provide a quantitative relationship between power input or temperature and steam flow through the valve.

30 Claims, 11 Drawing Sheets

QUANTIFYING ISOLATION VALVE LEAKAGE

This is a continuation-in-part of co-pending application Ser. No. 337,625 filed on Apr. 13, 1989, now abandoned.

BACKGROUND OF THE INVENTION

The present invention relates to piping systems and associated valves, and more particularly, to a method and apparatus for quantifying the leakage through an isolation valve.

Recent investigations into the loss or deterioration of heat rates in nuclear and fossil power plants indicates that nearly half of such loss is attributable to incomplete plant cycle isolation. As a practical matter, such degradation is a result of leaking isolation valves dumping high pressure steam to the plant condenser.

Some effort has been made to identify the sources and magnitudes of isolation valve leaks, but known techniques are unreliable and are not adapted for providing detailed information suitable for setting up a comprehensive plant maintenance and improvement program. One known technique momentarily locates a sensor downstream of a valve, and the acoustic emissions occurring due to leaking steam are analyzed to characterize valve leakage as small, medium or large without further quantification. A major problem with this type of technique is the significant extent of background noise.

In an even more informal technique, an experienced site engineer may use a stethoscope to listen for valve leakage and feel the pipe and pipe hangers downstream of the valve to detect a rise in temperature. In this seat of the pants approach, the result is a qualified guess as to whether the valve leakage is small, medium or large.

SUMMARY OF THE INVENTION

It is thus an object of the present invention to provide a method and apparatus for quantifying the leakage through an isolation valve or the like.

It is a further object of the invention to provide such quantification in a manner that can easily be repeated at intervals selected by the operator.

It is a more particular object to enable such operator to easily make a plurality of measurements throughout the plant on a consistent basis, so that the resulting data may be utilized in a plant maintenance and planning program.

It is a further object that the method and apparatus provide a real time display or record of the leak rate, which can be observed by the technician who is making the measurement at the location of the valve or associated piping, and optionally, for further use in a central computing or planning station.

In accordance with the invention, valve leakage is quantified by measuring a variable that is commensurate with a heat transfer characteristic of the pipe wall and comparing the measurements to data stored in a database which embodies a quantitative relationship between an index commensurate with the heat transfer characteristic variable and a range of valve leakage rates that could occur for the given valve.

In a straight forward implementation of the invention, a thermal hydraulic analysis of the specific valve and associated piping are performed a priori to establish a data base of pipe wall temperature downstream of the valve as a function of steam flow rate. The wall temperature is simply measured and compared with the data base.

In another embodiment, an air cooled sleeve is installed around the pipe downstream of the valve, and a controlled flow of air is passed through the annulus between the pipe and the sleeve. The temperature rise of the flowing air is measured and is used to compute the flow rate of steam leaking through the valve.

In yet another embodiment, the valve leakage is quantified by monitoring and controlling heat input into a local section of a horizontal pipe upstream of the valve. The center zone of the heaters is controlled to raise the pipe temperature a certain amount above the steam temperature and the power required to maintain the power is measured. The database provides a quantitative relationship between such power input and steam flow through the valve.

In a variation of the embodiment summarized in the immediately preceding paragraph, the converse relationship is utilized, i.e. the heaters are controlled to introduce a constant, known power into the pipe wall. The measured wall temperature is the independent variable from which the steam leakage flow rate is determined using a quantitative relationship between wall temperature and steam flow.

BRIEF DESCRIPTION OF THE DRAWINGS

These and other objects and advantages of the invention will be described below with reference to the accompanying figures, in which.

DESCRIPTION OF THE PREFERRED EMBODIMENTS

Figure 1:
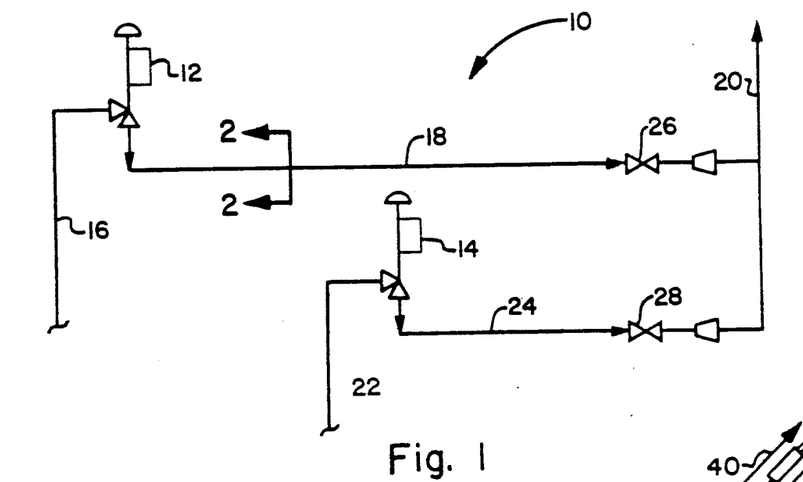
FIG. 1 is a schematic of a portion of the piping system associated with isolation valves for an industrial process.

FIG. 1 shows a portion 10 of an industrial process in which the fluid in the process is isolated from other portions of the system by one or more isolation valves 12, 14. In the illustrated portion 10 of the system, an upstream pipe 16 contains fluid at a temperature and pressure defined by the operation of, for example, a steam generator in a nuclear or fossil power plant. The downstream pipe 18 connects the valve 12 to a bypass line 20, which for example, may lead to a condenser portion of the power plant (not shown). Similarly, upstream line 22 is exposed to a given process condition and downstream pipe 24 is exposed to the bypass condition in line 20. Pipes 18 and 24 may be connected to the bypass line 20 through check valves 26, 28. In order to maintain maximum efficiency, i.e. heat rate in the process cycle to which pipes 16 and 22 are connected, isolation valves 12, 14, and other such valves that may be connected to the process, should not leak. Flow through valves 12, 14 should occur only when necessitated or desired for safety or other purposes, but typically not during nominal operating conditions.

Figure 2:
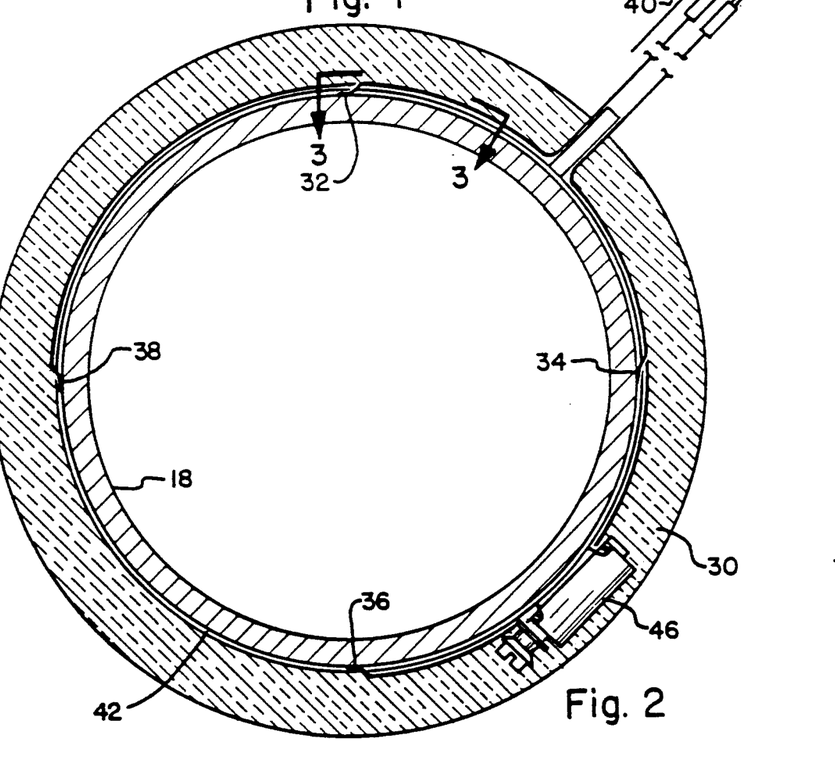
FIG. 2 is a section view taken along line 2—2 of FIG. 1, showing the first embodiment of the invention.
Figure 3:
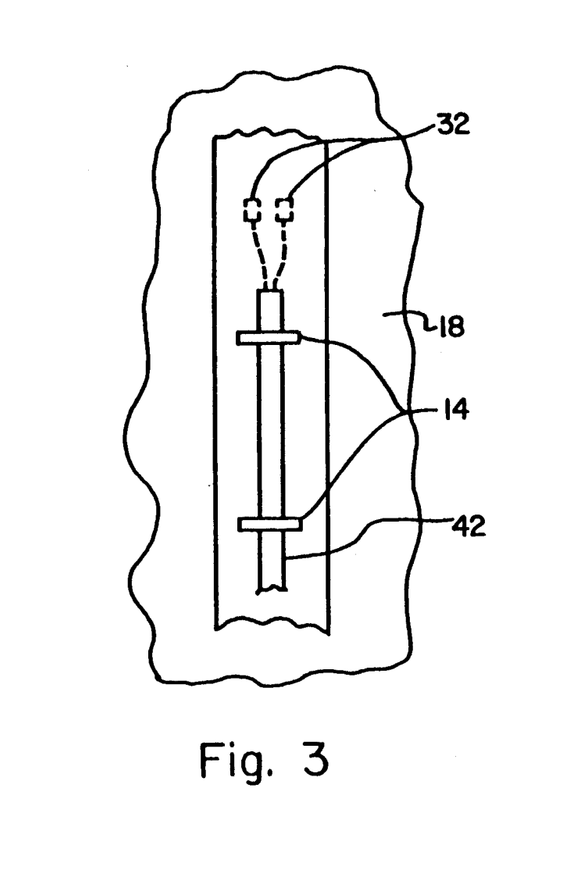
FIG. 3 is an enlarged detail view taken along line 3—3 of FIG. 2.

FIGS. 2 and 3 illustrate one embodiment of the present invention wherein the leak rate, for example through valve 12, can be quantified. Typically, pipe 18 has a thick layer of insulation 30 in intimate contact therewith. In accordance with the present invention, a plurality, typically four, temperature sensors such as 32, 34, 36, 38, are supported on the outer surface of the pipe 18, beneath the insulation 30. In the particular embodiment shown in FIGS. 2 and 3, the thermocouples 32, 34, 36, and 38 are spaced apart 90° from each other and are held in place by a circumferentially extending stainless steel band 42 having straps 44 or the like for supporting the cable and associated leads which, more conveniently, are gathered together and terminate outside the insulation at one or more connectors 40. A screw clamp 46 or the like can be used to tighten the steel band 42 around the outer diameter wall or surface of the pipe 18.

The quantification of the leak rate in accordance with the present invention is based on measuring a thermal variable on the pipe that is associated with the isolation valve, such as temperature, and computing the leak rate from a quantitative relation between the measured thermal variable and the rate of fluid leakage through the valve at a given process condition. Typically, the quantitative relation would be in the form of a database or a functional relationship that is established a priori for the particular sizes and material composition of the upstream pipe 16, valve 12, downstream pipe 18 and bypass line 20, and the fluid properties and conditions associated with the process cycle to which line 16 is exposed. Typically, pipe 16 is connected to a main steam line of a nuclear or fossil power plant, or a steam supply line for some other industrial process.

Figure 4:
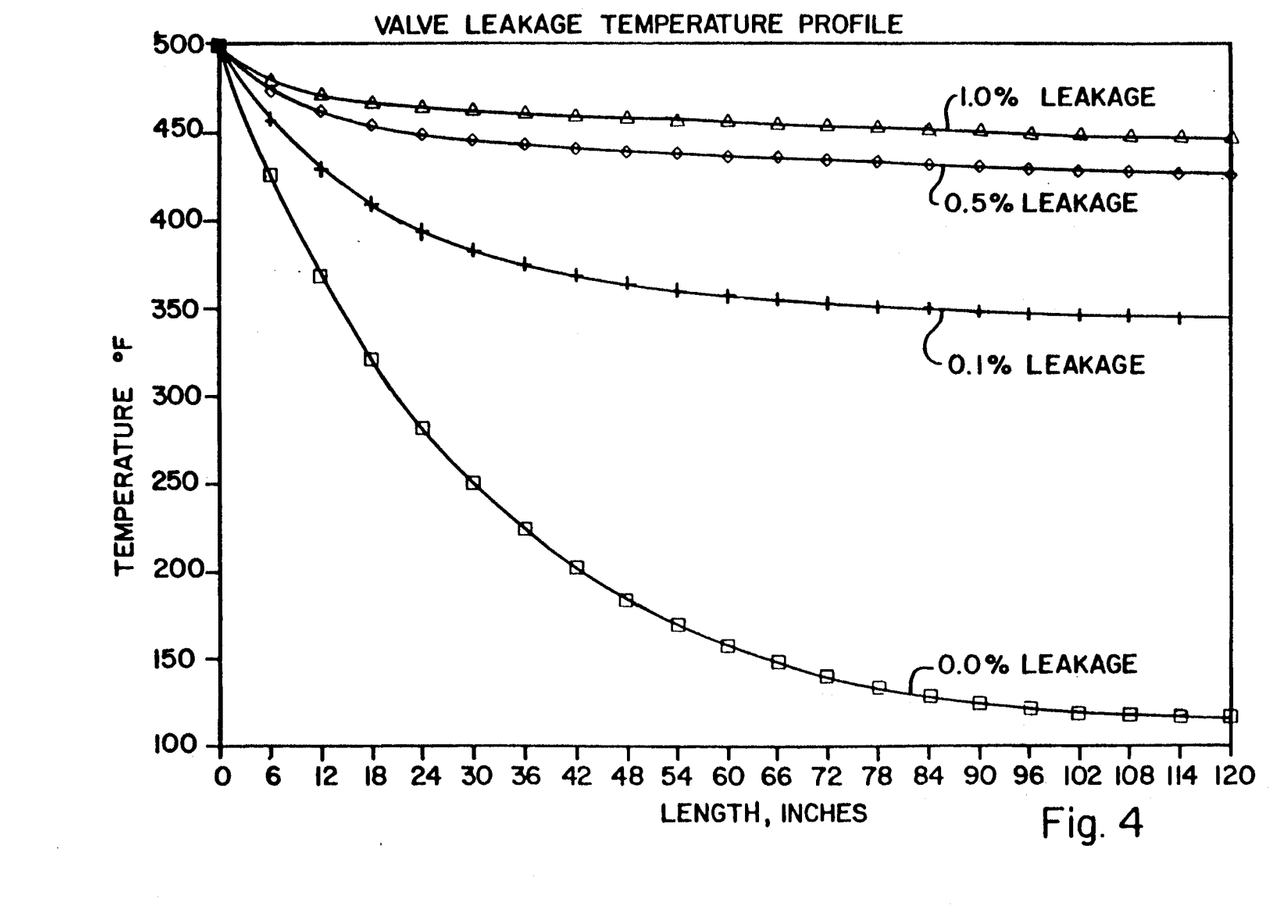
FIG. 4 is a graphic representation of the dependence of pipe wall temperature downstream of a typical isolation valve for various leakage rates.

FIG. 4 is a graphic illustration of a relationship determined analytically between the outside wall temperature of the downstream pipe 18, as a function of distance from the bypass valve 12, for isolating valve leak rates varying from 0 to 1% of throttled flow, at operating conditions of the system as manifested in line 16. It can be seen that, at a distance of five feet (60 inches) from the valve outlet, the outside temperature of the pipe if no leakage occurs, is approximately 165° F., whereas at the same pipe location and an assumed 1% leakage rate, the wall temperature increases to about 450° F. This extent of outside wall temperature dependence on leak rate is sufficient to support a reasonably accurate determination of leak rate from a wall temperature or equivalent measurement.

In the embodiment of the invention shown in FIGS. 2 and 3, the band of thermocouples 32, 34, 36, and 38 will thus preferably be located approximately 60 inches from isolation valve 12, based on the predicted temperature dependence shown in FIG. 4. Generally, before the thermocouples are installed, the piping arrangement, such as shown in FIG 1, is inspected and preferably photographed, the material types, properties, and the condition of the insulation noted, and the results entered into a computer program or the like which is adapted to perform thermal hydraulic analyses of piping systems. Such programs could include ANSYS, which is widely available to utilities in the United States, or its equivalent. For each valve 12 and associated piping 16, 18, over a variety of steady state process conditions in upstream pipe 16, a database, or a functional relation, of the quantitative relation between an index commensurate with the heat transfer characteristic of the downstream pipe wall, and a range of valve leak rates that could occur when the upstream pipe 16 is exposed to the process condition, is established. In effect, data equivalent to plots, such as shown in FIG. 4, are prepared for each valve 12 at one or more assumed or known process conditions. From the data from each valve as shown in FIG. 4, the number of thermocouple bands 42 and their axial position along the pipe 18 from the valve 12 will be selected on the basis of maximizing the difference in expected temperature or other measured thermal property between zero and the maximum assumed leakage while avoiding anomalies or interferences resulting from the peculiarities of the piping or other environmental factors associated with each valve. These data can be provided under the assumption that either the insulation will be in place or will be removed during the measurement.

Preferably, the thermocouples 32, 34, 36, 38 are essentially permanently mounted on the pipe 18 and covered with insulation 30, as shown in FIG. 2, with only the connectors 40 exposed near the surface of the insulation. Whenever the plant operator decides to perform a leak test, a cart with test equipment, to be more fully described below, can be wheeled to the location of the thermocouples, and the connectors 40 can be plugged into the test station. The operator then assures that the process conditions in the upstream piping 16 and the other conditions associated with the piping system are within the tolerances or envelopes of the database that was previously prepared. The temperatures are measured and the resulting inferred leak rate can be displayed to the technician and recorded on paper or on computer media for input into a master plant maintenance program from which similar data from other valves 14 are accumulated and processed to determine plant optimization decisions.

For example, using computer programs such as Pepse, Orcent-II or Therm, which are commonly available, the valve leakages having the greatest impact on plant heat rate can be identified and given higher priority for repair during the next outage. Similarly, after a pattern of leakages and time periods between repair and subsequent leakage develops, a planned maintenance program can be established to minimize the adverse impact of isolation valve leakage over the long term operation of the plant.

Figure 5:
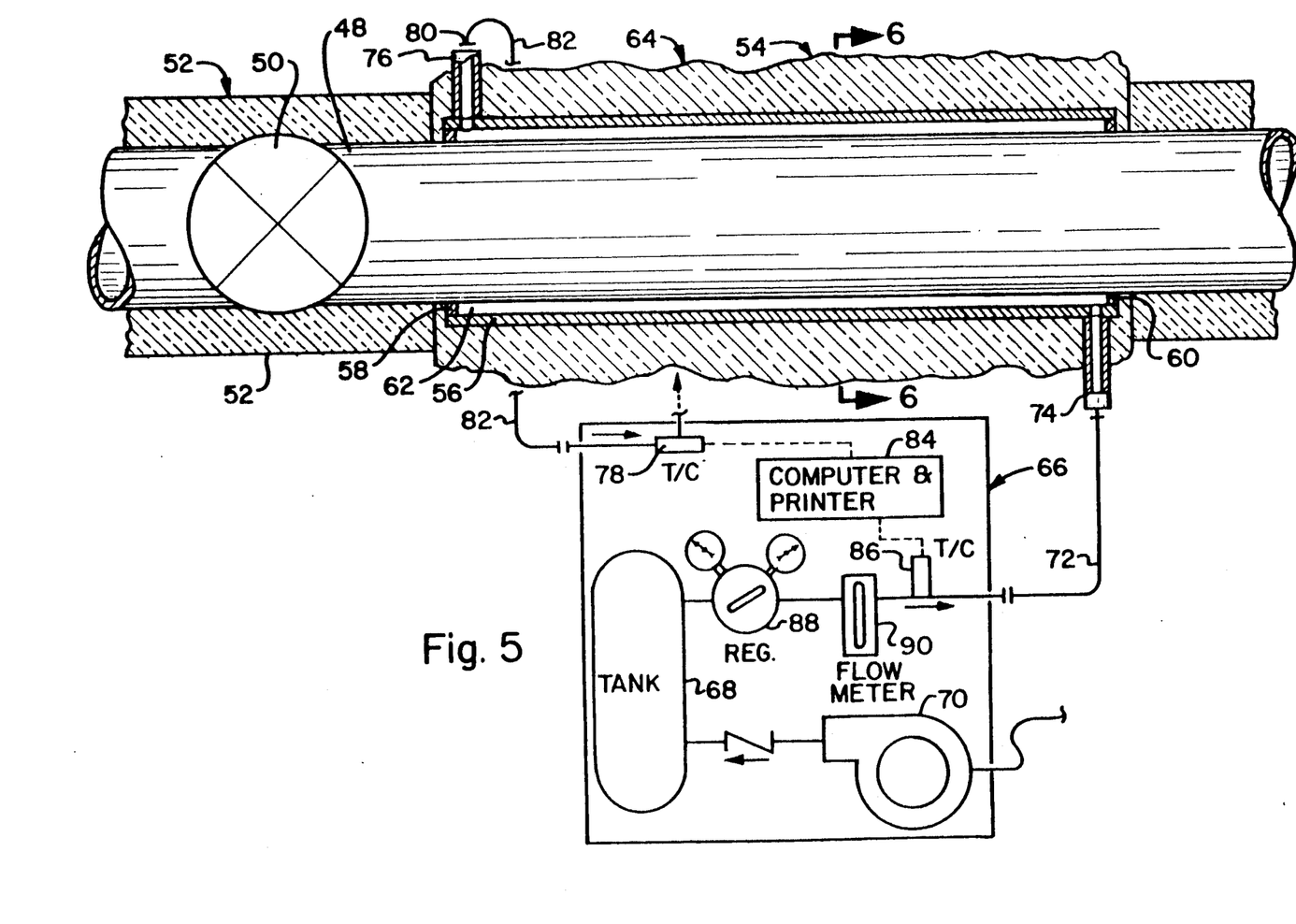
FIG. 5 is a top view, in part longitudinal section, showing the second embodiment of the invention.
Figure 6:
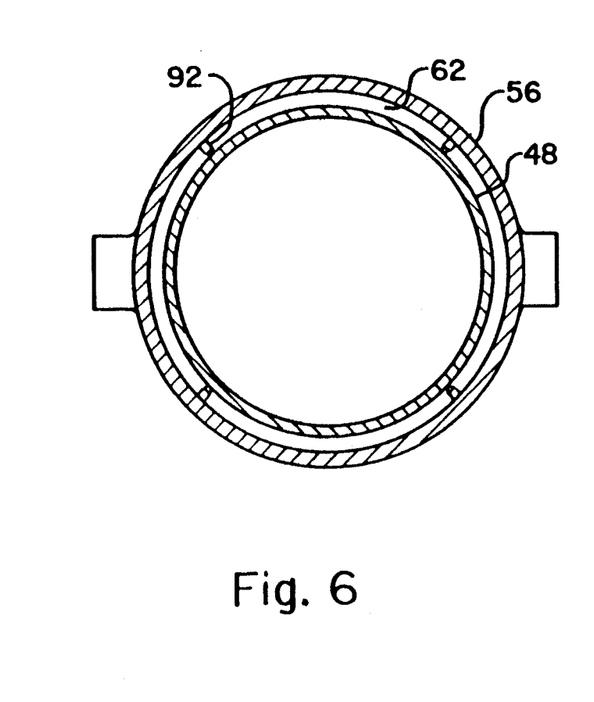
FIG. 6 is a section view taken along line 5—5 of FIG. 5.

FIGS. 5 and 6 show another embodiment of the invention wherein the downstream pipe 48 near isolation valve 50 has the normal insulation 52, such as hydrous calcium silicate removed and replaced with a measurement sleeve 54. The sleeve 54 includes a pipe 56 defining a cylinder and end closures 58, 60 which thereby define a sealed annular space 62 between the cylinder 56 and the pipe outer surface 48. A strapped-on insulating blanket 64 is wrapped around the cylinder 56.

A measuring station 66, preferably portable, is independently relocatable relative to the measurement sleeve 54 and can be wheeled adjacent to the sleeve 54 whenever a leakage test is to be performed. The measurement station 66 typically includes a tank 68 of air and associated compressor 70, which supplies cold air through inlet line 72 and inlet nozzle 74, to annulus 62. The air is discharged through outlet nozzle 76 into outlet line 80, 82 which passes the air to thermocouple 78. The thermocouple is connected to a computer and printer 84 at the measurement station 66. A thermocouple 86 connected to the inlet line 72 senses the temperature of the air delivered to the annulus 62, and the flow rate is regulated and metered through devices 88, 90. As shown in FIG. 6, the cylinder 56 preferably has a plurality of spacers 92 projecting radially inwardly to maintain a substantially uniform annulus 62.

The sleeve arrangement 54 is thus relatively easy to install on a permanent basis, and the measurement station 66 can easily be located and plugged-in to produce a steady state flow of air through space 62 and make the required measurements. In this embodiment, which may be preferred for use in locations, such as main steam isolation valves, a controlled flow of cool air is delivered to the annulus. The temperature rise of the flowing air will be a function of the leaking steam flow from the isolation valve 50. As with the embodiment illustrated in FIGS. 1-4, the functional or other quantitative relation between temperature rise of the air in the annulus and the leaking steam flow can be predicted analytically or determined experimentally a priori.

Figure 7:
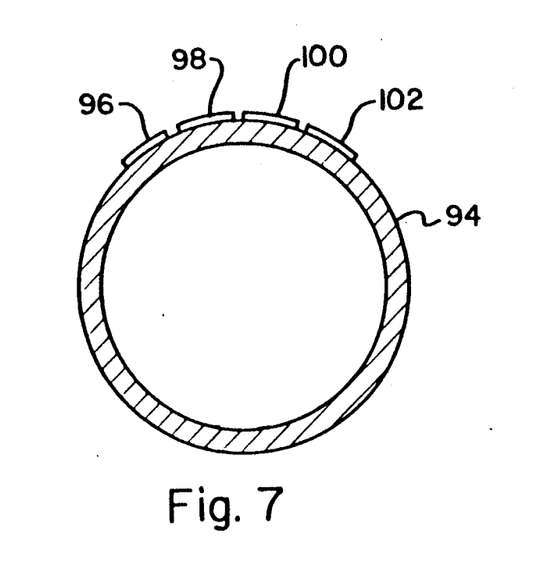
FIG. 7 is a cross section view of a pipe associated with an isolation valve, including strip heaters for implementing the third embodiment of the invention.
Figure 8A:
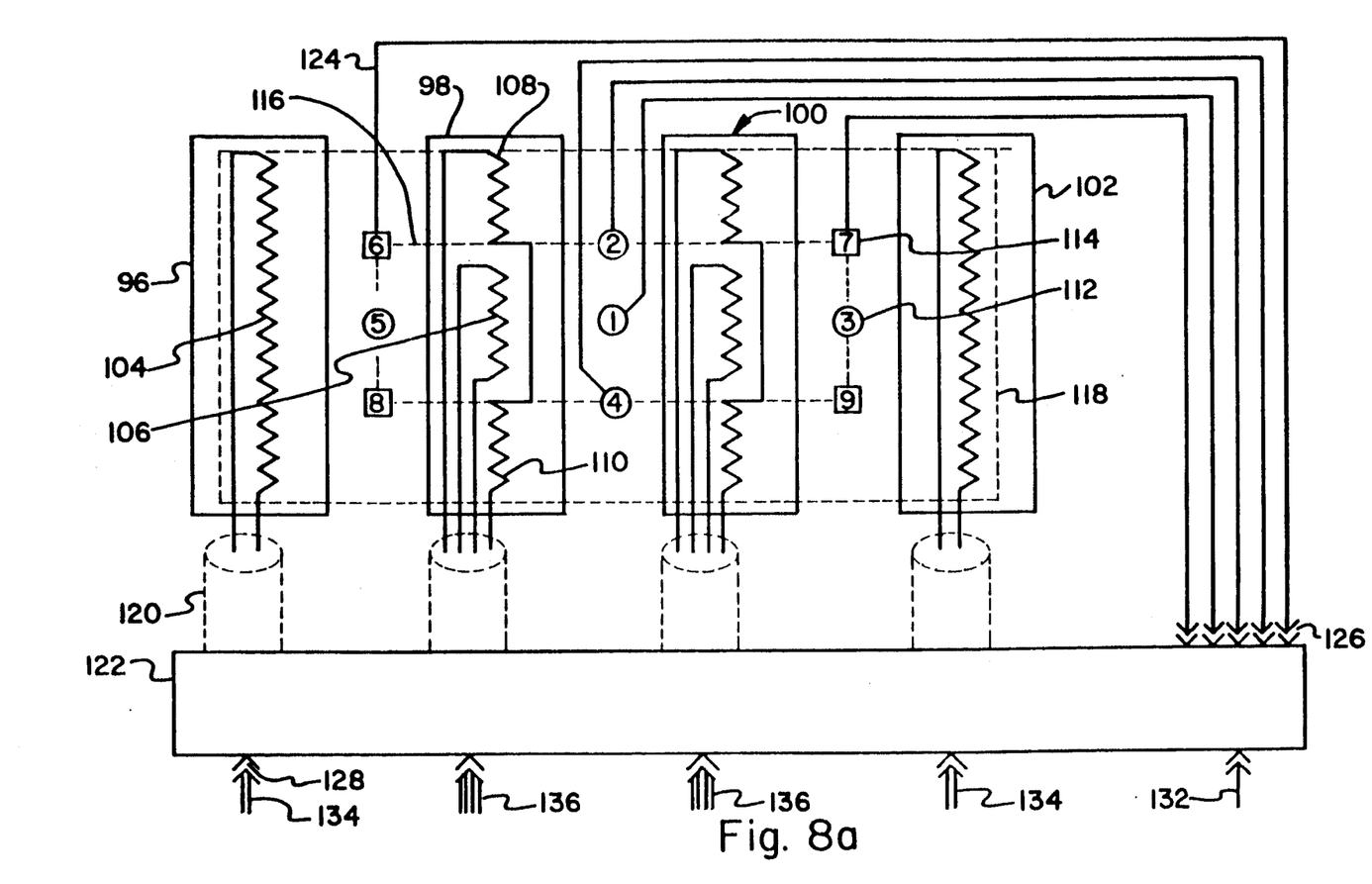
FIGS. 8a and 8b are schematics of the heat generation and temperature measurement components associated with the third embodiment of the invention.
Figure 8B:
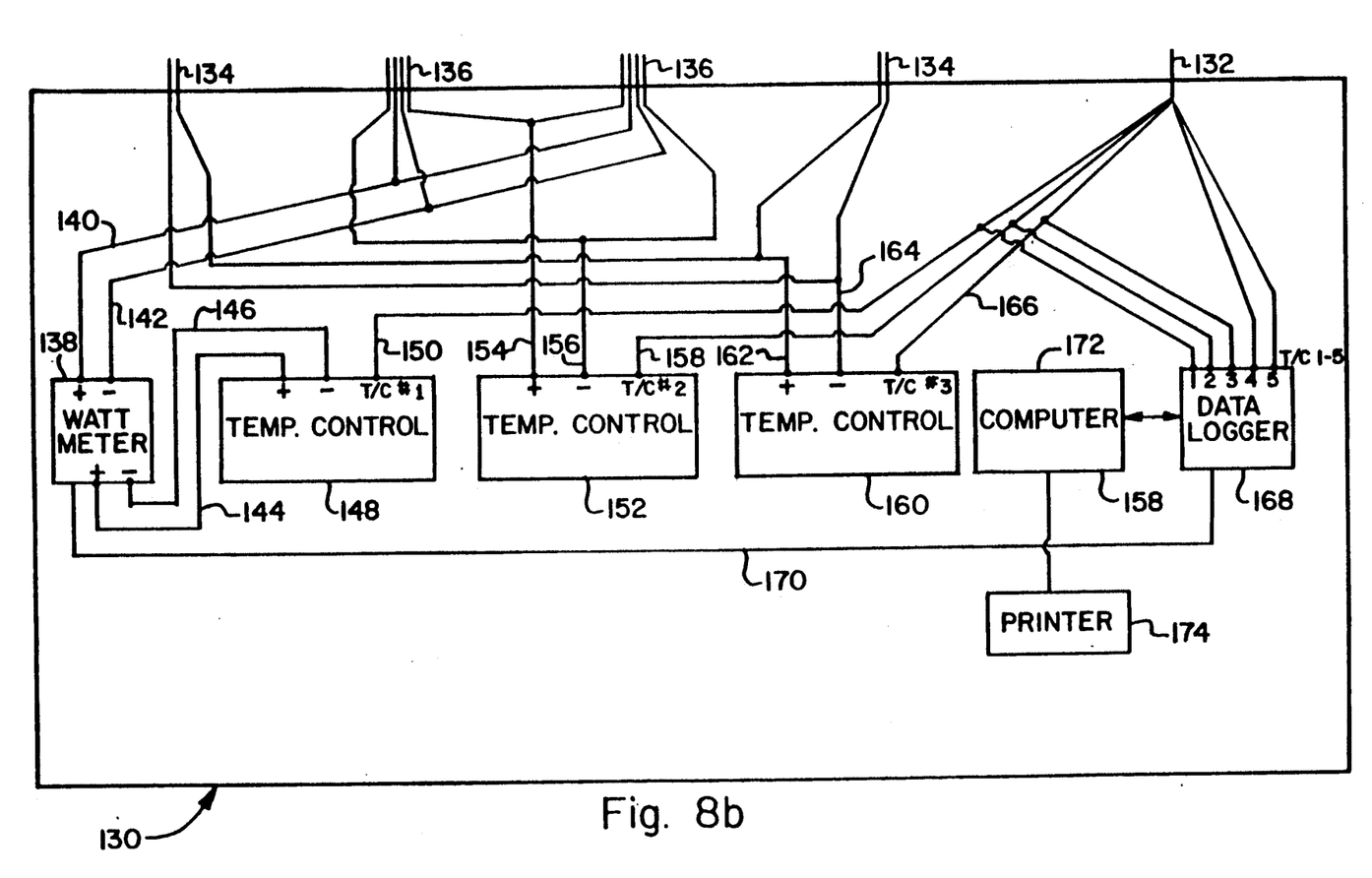

FIGS. 7 and 8(a) and 8(b) show a third embodiment of the invention whereby the valve leakage is quantified by monitoring and controlling heat input to a local section of a horizontal pipe 94 upstream of an isolation valve. FIG. 7 shows a cross section of pipe 94, and a plurality of heater strips or segments oriented longitudinally on the pipe surface. For convenient reference, heater strip 96 will be referred to as the left outer heater, 98 as the left inner heater, 100 as the right inner heater, and 102 as the right outer heater.

As shown in FIG. 8a, the outer heaters 96, 102 include a single heating element 104, and the inner heaters 98, 100 have 4 compound heating elements consisting of a center region 106 and independent peripheral regions 108, 110. The heater strips 96, 98, 100, 102 are in closely spaced, parallel relation, which provides exposure of the underlying outer surface of pipe 94, for the mounting of a plurality of thermocouples 112, 114. In the illustrated embodiment, thermocouple #'s 1, 2, 3, 4, and 5 define an orthogonal set 112, centered about thermocouple #1, so that #'s 3 and 5 define an x axis and #'s 2 and 4 define a y axis. Optionally, the set of thermocouples 114 are located at diagonal corner positions as indicated by #'s 6, 7, 8 and 9. These thermocouples 112 and central heating region 106 define a first, inner control zone 116 within which the surface temperature of the pipe 94 is to be maintained at a substantially constant, predetermined temperature. The envelope defined by the extremities of the heating elements 104, 108, define a second, outer control zone 118.

Leads associated with each heater pass through respective flexible conduits 120 to a junction box 122 which is substantially permanently mounted on the piping 94. Similarly, the leads 124 associated with the thermocouples 112, 114, are connected at 126 to the junction box 122.

In a manner similar to that described with respect to the second embodiment shown in FIG. 5, a portable control panel 130 (FIG. 8b) can be placed on a cart (not shown) and wheeled to the location of the junction box 122 when a leakage measurement is to be made. Heater leads 134 associated with outer heaters 96, 102, and heater leads 136 associated with inner heaters 98, 100 are selectively connectable such as at 128 to the junction box, and a multi-conductor wire 132 is likewise connectable between the control panel 130 and the junction box 122.

In the illustrated embodiment, the temperature of the pipe wall within region 116 is maintained at a constant 500° F., for example, by controlling the heaters so that the temperatures of the thermocouples 112 indicate 500° F. The heaters are arranged and controlled such that the heat generated within control zone 116 flows only radially relative to the pipe 94 because the heat generated between region 118 and 116 maintains a substantially steady state heat balance along the x and y axes at the boundary of region 116.

The heaters are wired such that a watt meter 138 is connected through lines 140, 142 to the central heater regions 106. Temperature controller 148 is connected to heater regions 106 via lines 144, 146 through the watt meter 148 and is responsive to the output of thermocouple #1 through signal line 150. A second temperature controller 152 controls heating elements 108 and 110, on heaters 98, 100 through signal lines 154, 156, and 158. Similarly, a third temperature controller 160 controls the output of heater elements 104 on heaters 96, 102 via lines 162, 164 and 166. Lines 158 and 160 are responsive to the thermocouple outputs for thermocouple #'s 2 and 3, respectively, and thus the signals on lines 150, 158, and 166 provide a feedback so that the heaters can be adjusted in accordance with the measured temperature. A data logger 168 receives the thermocouple readings from multi-conductor 132 and the watt meter output via line 170. A portable computer, such as an IBM XT 172 interacts with the data logger 168 and with a printer 174 for recording the data. The computer can have a monitor (not shown) for displaying to the technician the thermocouple readings, watt meter output, and calculated leakage rate while the test is being performed. In addition, the computer can record the data on computer media, such as a diskette or the like, which may in turn be combined with similar data from readings taken from other valves throughout the plant.

It should be appreciated that the first embodiment of the invention is the easiest to implement and preferably would be used if circumstances permit, i.e. if the temperature profile of the downstream pipe has a strong dependence on leak rate, and a sufficient straight length of pipe immediately downstream of the valve is available for mounting the sensors.

In practice, however, in many power plants an insufficient straight length of pipe is available such that accurate modeling and proper spacing for the sensors is very difficult. Moreover, depending upon the steam conditions, it may be difficult to properly account for heat losses through the valve itself. An additional complication arises when the fluid downstream of the valve cannot be characterized as fully developed turbulent flow. In such circumstances, i.e. where the steam is of a relatively low quality or has experienced substantial condensation, the heat transfer coefficient from the fluid to the pipe walls approaches a comparatively insulating character, i.e. condensing film or boiling film regime. These conditions result in very little variation in pipe wall temperature with variations in leak rate.

Thus, the first embodiment of the invention is suitable for use in a straight, horizontal run of dry steam that is characterized by fully developed turbulence. If the first embodiment is to be implemented downstream of the valve, care must be taken in properly modeling the heat losses through the valve.

A variation of the first embodiment can be implemented even if some of the foregoing limitations are relaxed if a sufficiently long straight run of pipe is available downstream of the valve. In this instance, sensors can be located at a plurality of axial positions, and the leak rates correlated to the temperature profile in a manner that is not as sensitive to the proper determination of absolute heat losses through, for example, the valve.

The second embodiment of the invention is somewhat more complicated than the first embodiment, but provides greater accuracy, and therefore, is preferable for use at critical locations in the plant where sufficient room is available downstream of the isolation valve.

In many circumstances, however, there will be insufficient length of straight pipe runs downstream of the valve, or the fluid conditions within the pipe deviate from fully developed turbulent flow, so that measuring the pipe wall temperature or the heat rate through the pipe wall will provide insufficient dependence on leak rate, and therefore, not provide satisfactory results. Under these circumstances, the third embodiment of the invention is preferred. Ideally, the third embodiment is implemented on a horizontal pipe run upstream of the valve with sufficient heat applied to the upper surface of the pipe to maintain the surface temperature of the pipe above the steam temperature in the pipe, preferably by a margin of at least 25° F., and preferably 50° F.

Typically, the upstream pipe, particularly under relative low leakage conditions, contains steam in a semistagnant condition. Due to the inevitability of some moisture entrained in the steam even as it exits the steam generator, slight condensation of the steam along the main steam line and a further condensation likely in the semi-stagnant fluid in the pipe upstream of the isolation valve, it is likely that some condensation has occurred in the pipe. This condensation is likely to be at the lower portion of the pipe. Moreover, the heating of the upper pipe surface drives away any condensation and prevents a boiling film condition on the corresponding inner pipe surface.

Thus, with the third embodiment of the invention, conditions are established in the pipe which justify the analytical prediction of the behavior of a thermal variable associated with the pipe surface, using the Dittus-Boelter film coefficient for fully developed turbulent flow, in a portion of the pipe that would otherwise not provide suitable conditions for the use of such film coefficient.

Under fully developed turbulent flow, the inside film coefficient varies with the steam flow rate. Therefore, the thermal resistance of the film varies with the steam velocity. By utilizing an external heat source and temperature controller, it is feasible to control the outside pipe temperature at a specific selected value. The heat required to maintain a constant outside pipe temperature will increase as the steam velocity increases. It is therefore feasible to analytically and/or experimentally establish a relationship between heat input (watts) and steam flow rate (lbs/hr) for a given pipe size.

The stored database or functional relation between an index and the leak rate are preferably based on the equations for calculating the thermal resistances and heat transmission as a function of steam velocity as set forth in the Appendix hereto.

Figure 9:
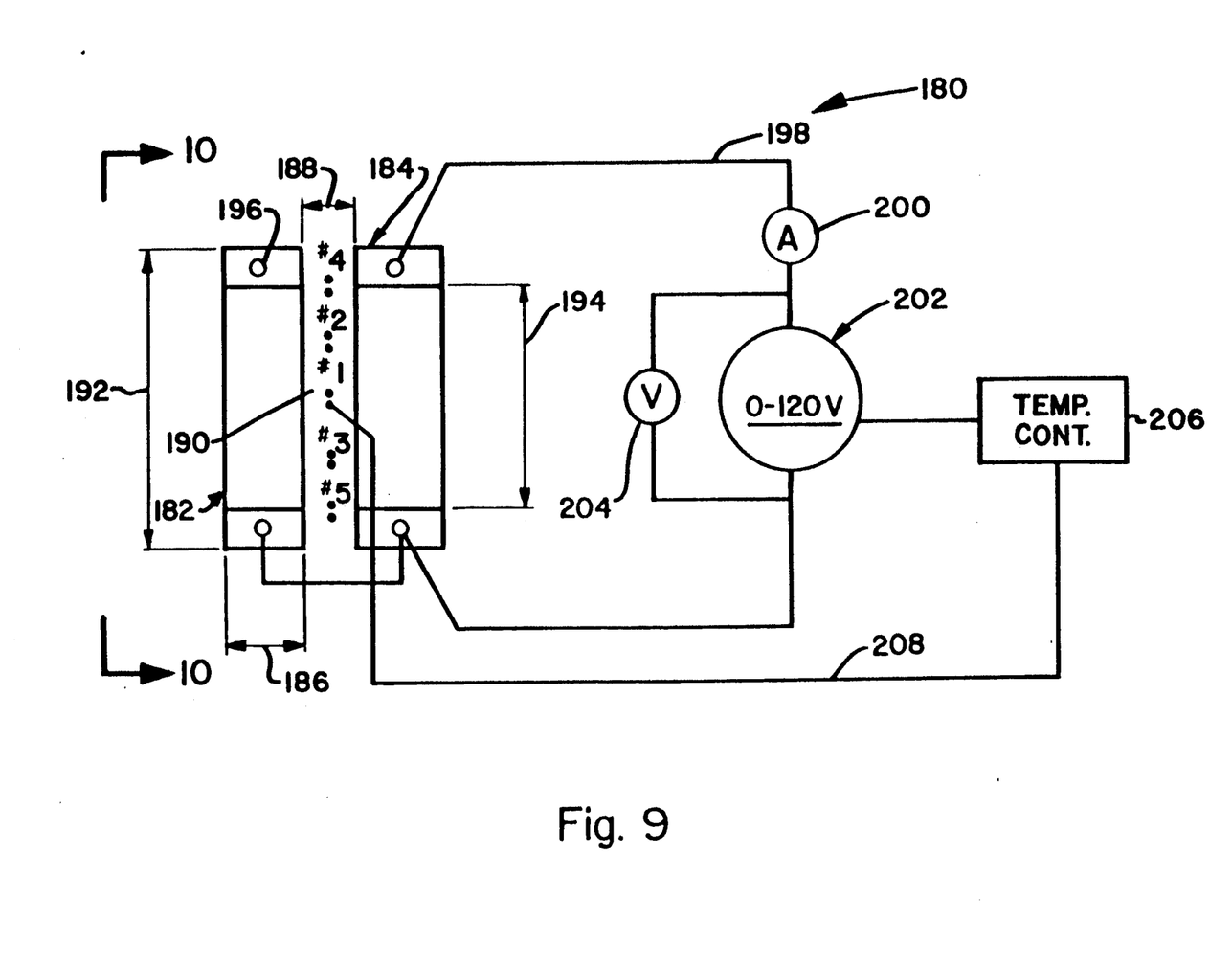
FIG. 9 is a schematic variation of the third embodiment of the invention shown in FIG. 8.
Figure 10:
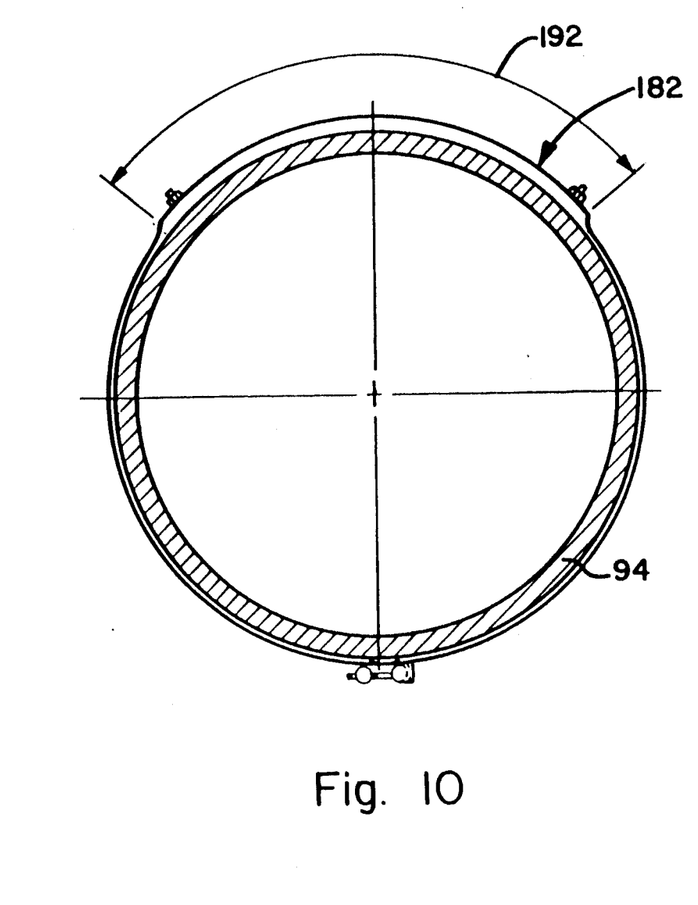
FIG. 10 is a section view of the pipe and associated heater arrangement of the embodiment shown in FIG. 9.

A variation of the third embodiment of the invention is shown as a schematic 180 in FIGS. 9 and 10. The variation of the invention as shown in FIGS. 9 and 10 will be described with reference to implementation on a typical 14 inch pipe 94 found in nuclear and fossil power plants.

Two band heater 182,184, such as the type available as Watlow code number B14A1JP21 8911 V129 W328 Type M are located side-by-side circumferentially along the upper surface of pipe 94 with a gap 188 of about 0.11 inch therebetween. Each heater 182,184 has a total length 192 of approximately 12.375 inches with a heated length 194 of about 11.125 inches and width of 1.5 inches. Five thermocouples 190, indicated by #'s 1-5, are located in the gap 188 with thermocouple #1 centered therein. The terminals 196 of the band heaters are connected via lines 198 in series with ammeter 200 and a variable voltage power supply 202. A volt meter 204 is connected in parallel to the power supply 202, and the power supply 202 is connected to a temperature controller 206 having a line 208 for receiving a temperature sensor signal from, for example, thermocouple #1. It should be appreciated that the schematic of FIG. 9 shows wiring for only one thermocouple, #1. Thermocouples #2 and #3, and #4 and #5, can be coupled to respective current, voltage, and control devices, for redundancy or mere monitoring.

The arrangement shown in FIG. 9 maintains a strip of the outer surface of the pipe 94 at target temperature, for example 50° F. above the steam temperature within the pipe, in a manner which permits determination of the power required to maintain such temperatures. As described above in connection with FIGS. 7, 8a and 8b, such data are compared with either analytical or empirical data to infer the leak rate in the valve that is situated in the same pipe run as is the instrumentation 180. It has been found that for a given size and type of pipe, experimental results are repeatable and are, in effect, offset from theoretical calculations such that satisfactory leak rate measuments can be made from comparison with the calibrated data base.

Due to the complex piping arrangement in nuclear and most fossil plants, the instrumentation 180 would be installed upstream of an isolation valve, where long vertical or horizontal runs of piping exists without the presence of other valves, elbows, etc.

Figure 11:
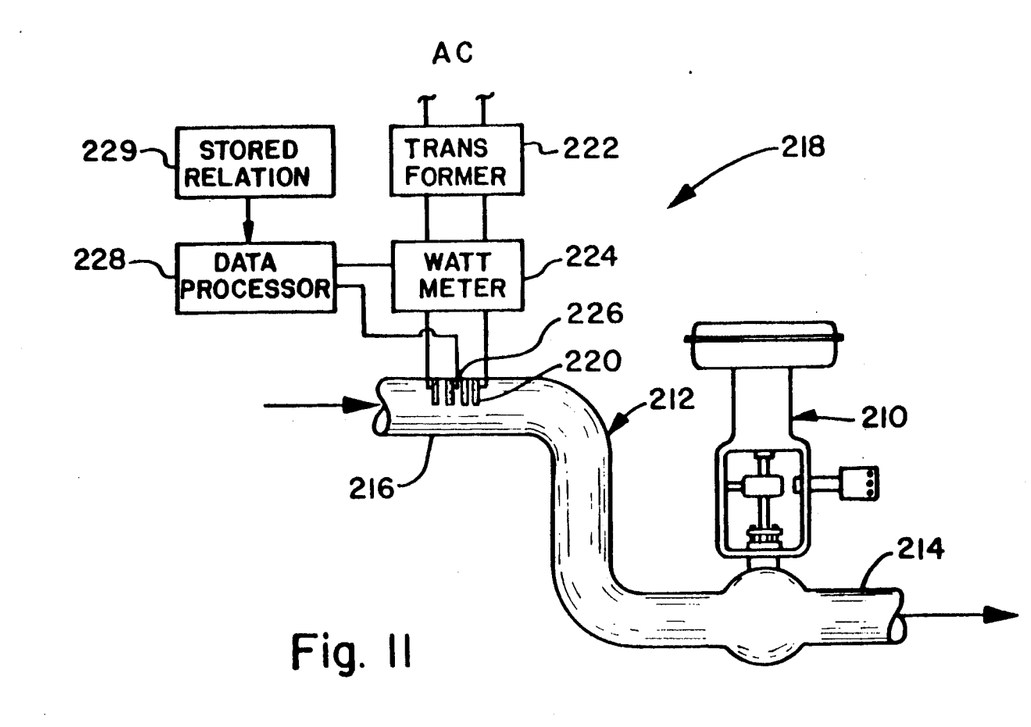
FIG. 11 is a schematic illustration of the equipment associated with another variation of the third embodiment of the invention.

FIG. 11 illustrates another variation of the third embodiment of the invention, wherein the leak rate associated with a steam isolation valve 210 in a process plant is determined by the temporary installation of test equipment 218 on a horizontal portion 216 of pipe 212 which is immediately upstream of the valve. The downstream pipe 214 would typically be fluidly connected to a condenser or similar steam bypass sink.

Preferably, four strip heaters 220 are secured circumferentially in closely spaced relation on the upper surface of the pipe portion 216. The heaters are energized in parallel by a power source in the form of a variable transformer 222 and an associated AC watt meter 224, all of which draw current from a 110 volt AC outlet. Primary and backup thermocouples 226 are located directly on the pipe wall centrally in the strip heater array and are connected with the watt meter to data processor 228. Preferably, the quantitative relation between temperature and leak rate is stored in digital memory 229.

Consistent with the previously described example, in which pipe portion 216 consists of a fourteen inch schedule 80 pipe (SA-106B material), two layers of fiber glass defining 1½ inches of insulation cover the pipe and the strip heaters. Each strip heater is held in firm contact over about a 100° span of the pipe circumference by low expansion clamping straps. The full 360° clamping action exerts pressure directly over the strips thus assuring an intimate mating of the heater lower surface to the cylindrical outer surface of the pipe wall.

Calibration tests are performed by first installing the test equipment in a laboratory environment with a valve of known zero leakage. Saturated steam at a reference pressure is introduced upstream of the valve. After two to three hours, when the thermocouple instrumentation indicates that the wall temperature of the pipe is substantially the same as the saturation temperature of the steam, the strip heaters are energized to produce a constant power sufficient to maintain the thermocouple at least 50° above the saturation temperature of the steam, but not higher than 600° F., the maximum permitted pipe wall temperature. The steam flow rate is then adjusted in a plurality of increments to acquire data for steam flow rates varying from zero to at least about one percent of the valve rated flow capacity.

Figure 12:
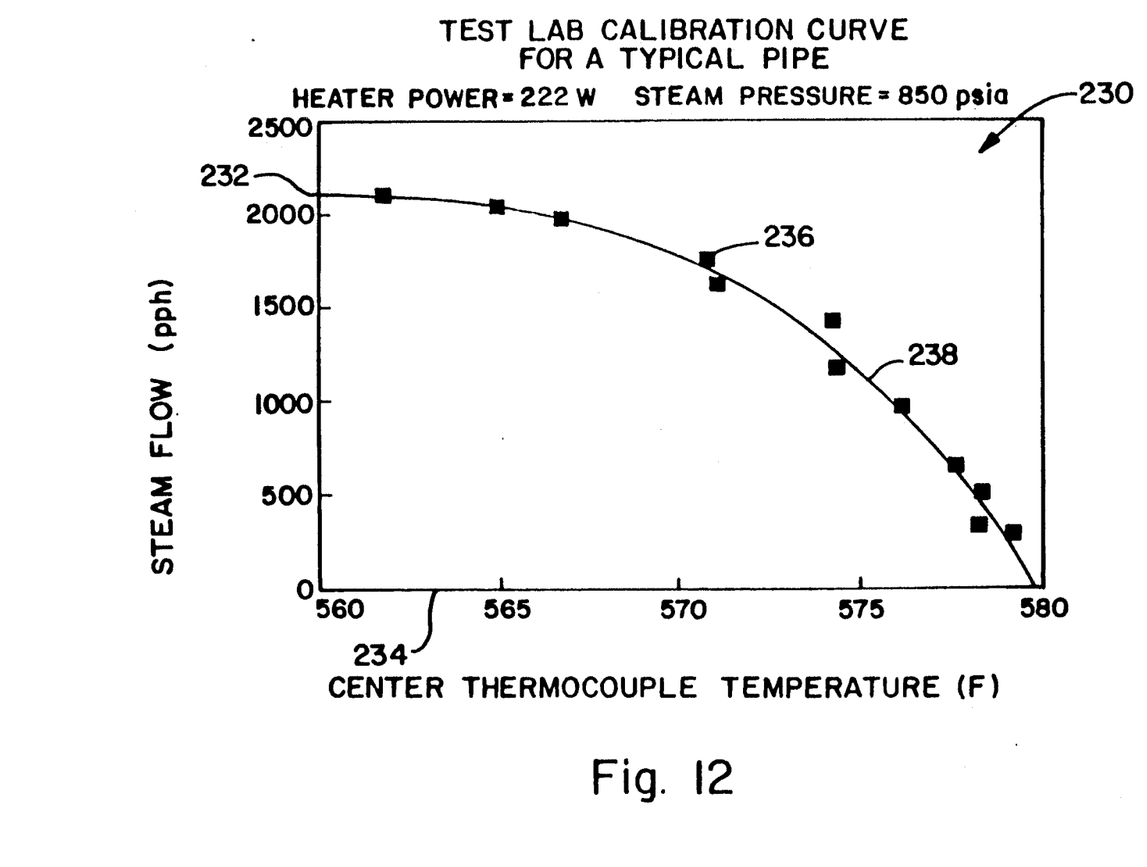
FIG. 12 is a graphic rendition of the quantitative relationship between steam flow leak rate and wall temperature at the measuring thermocouple for a particular implementation of the second variation of the third embodiment of the invention.

FIG. 12 shows a lab calibration graph 230 for the fourteen inch schedule 80 typical pipe were the heater power is 222W and the steam pressure is 850 psia. Steam flow 232 is shown as having an effect on the wall temperature as indicated by the central thermocouple temperature 234. Thus, pipe wall outer surface temperature varies as a function of steam flow rate, such that with zero flow (no valve leakage), the pipe wall temperature is approximately 580° F. at the center of the heater elements, whereas at a leakage flow rate of 2,100 lbs/hr, the temperature drops approximately 18° F., to 562° F. The squares 236 indicate actual test data points, whereas curve 238 would be used in the field for determining the actual leak rate.

It is apparent from a review of curve 238 that there is a greater temperature change of the reference thermocouple as the isolation valve leak rate increases. As the leak rate increases from 0 to 1,000 lbs/hr, the temperature drops approximately 4.3° F. For a leak rate increase from 0 to 2,100 lbs/hr, the temperature is reduced approximately 13.8° F. At 2,100 lbs/hr, the temperature is dropped 18.3° F. compared to the value at the zero leak rate. Therefore, the measurement technique becomes more sensitive as the isolation valve leak rate increases.

It is also apparent based on measurements from other thermocouples used during laboratory testing (but not necessary for field measurements) that the reference or measurement thermocouple at the center of a four heater element array exhibits the highest wall temperature. There is an axial gradient of 18°-20° F. from the centerline of the heater array to the pipe surface on the periphery of the outer heaters. This value appears relatively constant even with varying steam flow. The same condition exists circumferentially from the centerline of the heater array to the edge of the heater elements. This indicates a relatively constant heat sink in the X-Y direction that is not affected much by the steam flow rate. During laboratory testing, thermocouples were also connected on the top and bottom surfaces of the heater elements. These indicated that the pipe temperatures underneath the heaters were generally 4°-8° F. higher than indicated by the thermocouples in the space between the heater elements.

Thus, in this implementation of the invention, band type heaters are utilized to provide a localized constant heat source on the top side of horizontal inlet piping to isolation valves. The temperature at the center of the constant heat source will decrease in a predictable manner with the steam flow rate increasing from 0 to at least 2,100 lbs/hr. This variation is believed due to the reduction in film resistance with increase in steam flow rate.

A laboratory calibration should be performed for each pipe size and heater configuration to be utilized in field installations. The pipe size, wall thickness and material should be identical to the field application. Power input should be experimentally established such that the maximum pipe temperature will not exceed 580° F. with zero steam leakage. Calibration should be performed over the leak rate range to be monitored and at the steam pressure that exists in the field during normal steady state operation. Preferably, three laboratory test runs should be performed at each flow rate to indicate repeatability of the data. It should only be necessary to perform lab calibration runs for five additional pipe sizes (4, 6, 8, 10, 12 inches) to have data for all pipe sizes of interest in power plant field tests. By performing lab calibration of the heater and thermocouple instrumentation, as described above, analytical solutions to determine pipe wall temperature variation as a function of isolation valve leakage would not be required.

Heaters and thermocouple instrumentation may be installed on the isolation valve piping in operating plants while the unit is in operation. This is feasible since no penetrations of the pipe wall are required. In the field, the condition of a truly "closed" valve may not be possible in every instance, due to leakage. Accordingly, the term "nominally closed" as used herein refers to the condition whereby the valve is indicated as being fully closed, but leakage may or may not be occurring.

Thus, it may be appreciated that, depending upon the particular conditions that prevail for a given isolation valve and its associated upstream and downstream piping, one of the three described embodiments, or their equivalents, would be preferred. In general, all three embodiments rely on three steps or components. First, a sensor is provided for measuring a thermal variable indicative of the heat transfer through the pipe. This thermal variable could be the pipe surface temperature (first and third embodiment), the power loss through a predefined surface area of the pipe (second embodiment), or the external power delivered to a predetermined portion of the pipe to maintain the pipe surface at a given temperature (third embodiment). An index signal is generated which is commensurate with the measurement of the thermal variable. For example, the index could be an absolute temperature as determined from the voltage generated by the thermocouples (first and third embodiment), a temperature change as determined from the thermocouple voltages (second embodiment), or a power determined from the watt meter (third embodiment). Finally, the index signal is used as an independent variable or equivalent to obtain an output signal indicative of the fluid leak rate.

The quantitative relationship between leak rate and the index signal can be in the form of a database look-up table a graph, a mathematical correlation, a function, or other analogous dependence. In one embodiment, a look-up table for each valve can be prepared a priori and stored in the computer of a work station that is connected to the sensors when a test is to be performed on the given valve. In another embodiment, a particular functional form of the relationship between leak rate and index signals is stored in the computer, and constants indicative of specific valve characteristics are set by the operator as he performs a test on each valve. The choice depends in part upon the type of modeling technique, the number of nodes and the computing power required to perform the calculation, the extent of central administrative control and quality assurance tracking, and the desirability of the plant operator or technician to make adjustments to the analytical model.

APPENDIX (1) $q = UA (T_o - T_i)$
where
$q$—Heat transmitted from strip heater to pipe (BTU/hr)
$U$—Overall heat transfer coefficient (BTU/hr-ft$^2$)
$A$—Area of pipe where heat input is controlled radially into pipe wall—ft$^2$
$T_o$—Temperature of O.D. of pipe—°F.
$T_i$—Temperature of steam—°F. (assumed to be saturation temperature corresponding to pressure)

(2) $$U = \frac{1}{\frac{R2}{Ri hi} + \frac{R2 \ln \frac{R2}{R1}}{k1}}$$

where:
$U$—Overall heat transfer coefficient (BTU/hr-ft$^2$)
$R2$—Outside radius of pipe—ft
$Ri$—Inside radius of pipe—ft
$k1$—Conductivity of pipe wall—BTU/hr-ft-°F.
$hi$—Inside film coefficient—BTU/hr-ft$^2$-°F.

(3) $$\frac{hiD}{kb} = .023 \left(\frac{DG}{\mu b}\right)^{.8} \left(\frac{Cp\mu}{k}\right)^{.4}_b$$

where:
*$hi$—Inside film coefficient (Dittus-Boelter)—BTU/hr-ft$^2$-°F.
$D$—Inside pipe diameter (ft)
$kb$—Thermal conductivity steam, evaluated at the bulk temperature (BTU/hr-ft-°F.)
$G$—Mass Velocity (lb/hr-ft$^2$)
$\mu b$—Viscosity of steam lb/hr-ft) evaluated at the bulk temperature
$Cp$—Specific heat at constant pressure (BTU/lb—°F.)
$(DG/\mu b)$—Reynolds number (dimensionless)
$(Cp\mu/k)b$—Prandtl number (dimensionless)

I claim:

1. A method for quantifying steam leakage through a nominally closed steam isolation valve located in a steam flow line, between an upstream pipe which is exposed to a steady state process steam condition and a downstream pipe which is exposed to a steady state bypass condition, each pipe having a tubular metal wall defining radially inner and outer surfaces which can experience different temperatures and which are capable of transferring heat radially through the wall at a heat transfer rate that is dependent on the steam flow along the inner surface, comprising the steps of:

storing a quantitative relation between an index that varies with the heat transfer rate through the wall of one pipe, and a range of valve leak rates that are possible when the upstream pipe is exposed to the process condition;

measuring at a selected position on said one pipe, a variable indicative of the heat transfer rate through said one pipe at said selected position;

from the measured variable, generating at an index signal commensurate with said heat transfer rate at said selected position; and comparing said index signal with said quantitative relation and generating from the comparison an output signal indicative of the leak rate through the nominally closed valve.

2. The method of claim 1, wherein the index is the temperature of the pipe wall outer surface.

3. The method of claim 1, wherein the step of storing a quantitative relation includes storing a quantitative relation between said index and a range of leak rates for a range of steady state process conditions.

4. The method of claim 1, wherein,
the step of measuring said variable includes mounting a plurality of temperature sensors on the wall of the downstream pipe at a preselected axial distance from the valve and generating sensor signals commensurate with the temperature of the outer surface of the wall of the downstream pipe,
the step of generating an index includes generating a signal indicative of the temperature of the outer surface of the wall of the downstream pipe, and
the step of comparing is performed when the process condition, bypass condition, and index signal reach a steady state.

5. The method of claim 1, further including the steps of:
fitting a sealed sleeve around a selected portion of the downstream pipe,
introducing a flow of cooling fluid through the sleeve, and
locating a sensor responsive to said heat transfer rate on the pipe wall and within the sleeve.

6. The method of claim 1, wherein,
the upstream pipe, valve, and downstream pipe including insulation experience a temperature distribution resulting from presence of steam in the flow line and the step of storing a quantitative relation includes the steps of
making an analytical model of the temperature distribution in the upstream pipe, valve, and downstream pipe including insulation, and
with the analytical model, computing the axial temperature distribution of the downstream pipe as a function of leak rate for at least one steady state process condition, and
the step of generating a signal includes the steps of
selecting at least one axially unique location on the downstream pipe wall for which the temperature was computed and at which the wall temperature will be measured, mounting a temperature sensor at each of said axial locations, and monitoring the temperature during a period of time when the process condition, bypass condition and temperature are constant over time.

7. The method of claim 1, further including the step of introducing a measured flow of heat onto the wall outer surface of said one connecting pipe at said selected position to maintain said surface at a preselected constant temperature, and wherein said index is the power defined by the flow of heat required to maintain said surface at the constant preselected temperature.

8. The method of claim 7, wherein the step of introducing heat includes:

securing a plurality of heater strips side by side on the pipe wall outer surface whereby spaces are defined between the strips, mounting a thermocouple in a space between the heater strips, and controlling the flow of heat generated by heater strips in response to the temperature indicated by the thermocouple.

9. A method for quantifying steam leakage through a nominally closed steam isolation valve located in a steam flow line between an upstream pipe which is exposed to a steady state steam process condition and a downstream pipe which is exposed to a steady state bypass condition, each pipe having a tubular metal wall defining radially inner and outer surfaces which can experience different temperatures and which are capable of transferring heat radially through the wall at a heat transfer rate that is dependent on the steam flow along the inner surface, comprising the steps of:

storing a quantitative relation between an index which is commensurate with a heat transfer characteristic of the upstream pipe wall and a range of valve leak rates that are possible when the upstream pipe is exposed to the process condition;

generating an index signal commensurate with said heat transfer characteristic of the upstream pipe wall when the upstream pipe is exposed to the process condition;

comparing said index signal with said quantitative relation; and generating from the comparison, an output signal indicative of the steam leak rate through the valve.

10. The method of claim 9, wherein the index is the pipe wall outer surface temperature.

11. The method of claim 9, wherein the step of storing a quantitative relation includes storing a quantitative relation between said index and a range of leak rates for a range of steady state process conditions.

12. The method of claim 9, wherein, the step of generating an index signal includes mounting a plurality of temperature sensors on the downstream pipe wall at a preselected axial distance from the valve and monitoring the temperature sensors, and the step of comparing is performed when the process condition, bypass condition, and temperature sensors reach a steady state.

13. The method of claim 9, further including the steps of:

fitting a sealed sleeve around a selected portion of the downstream pipe, introducing a flow of cooling fluid through the sleeve, and locating a sensor responsive to said heat transfer characteristic on the pipe wall within the sleeve.

14. The method of claim 9, wherein, the upstream pipe, valve, and downstream pipe including insulation experience a temperature distribution resulting from the presence of steam in the flow line and the step of storing a quantitative relation includes the steps of:

making an analytical model of the temperature distribution in the upstream pipe, valve and downstream pipe including insulation, and with the analytical model, computing the axial temperature distribution of the downstream pipe as a function of leak rate for at least one steady state process condition, and the step of generating a signal includes the steps of:

selecting at least one axially unique location on the downstream pipe wall for which the temperature was computed and at which the wall temperature will be measured, mounting a temperature sensor at each of said axial locations, and monitoring the temperature during a period of time when the process condition, bypass condition and temperature are constant over time.

15. The method of claim 9, further including the step of introducing a measured amount of heat onto a selected outer surface of the downstream pipe to maintain the selected surface at a preselected constant temperature, and wherein the heat transfer characteristic is the heat required to maintain the selected surface at a constant preselected temperature.

16. The method of claim 15, wherein the step of introducing heat includes:

securing a plurality of heater strips in spaced side by side relation on the pipe wall, mounting a thermocouple in a space, and controlling the flow of heat generated by the heater strips in response to the temperature indicated by the thermocouple.

17. A system for measuring steam leakage through a steam isolation valve connected between an upstream pipe containing steam from a process condition and a downstream pipe at a known bypass condition, the pipes having tubular walls defining inner and outer surfaces between which heat is transferred when the surfaces are at respective inner and outer temperatures, the system comprising:

means for storing a quantitative relation between an index dependent on the heat transfer characteristics through the outer surface of the wall of the upstream pipe and steam leakage through the valve at a given process condition;

means secured to a selected outer surface of said upstream pipe for measuring a thermal variable on said pipe which is dependent on said heat transfer characteristics;

means for generating a heat transfer index signal from the measured thermal variable;

processor means responsive to the index signal and coupled to the means for storing a quantitative relation for computing steam leak rate from said quantitative relation; and means for recording the computed leak rate.

18. The system of claim 17, wherein said index is the temperature of the pipe outer wall surface.

19. The system of claim 18, further including:

power generation means for applying heat at a constant rate to the selected outer surface of said pipe wall.

20. The system of claim 18, further including:
heater means secured to a selected vertically upper, outer surface of a horizontal run of said upstream pipe;
temperature sensors secured to the selected outer surface of the pipe adjacent the heater means;
heater control means for applying a constant rate of heat energy to the selected surface.

21. The system of claim 20, wherein,
the heater means includes a plurality of closely spaced heater strips, and
the temperature sensors include at least one thermocouple secured to the pipe surface in a space between the strips.

22. The system of claim 17, wherein said index is the heat transfer rate through the pipe outer wall surface.

23. The system of claim 17, including means for delivering heat energy in the form of electrical power to said selected outer surface, and wherein said index is the electrical power required to maintain the outer wall surface at a constant temperature.

24. A method for measuring steam flow through a nominally closed isolation valve situated in an ambient environment within an industrial plant, the valve connected between a horizontal upstream pipe portion containing steam and a downstream pipe portion, comprising the steps of:
establishing a steady state reference condition of steam pressure and pipe temperature in the upstream pipe portion while the valve is nominally closed;
applying a source of heat at a predetermined constant rate to a selected external surface of the upstream pipe portion to establish a steady state test temperature on said selected external surface;
measuring the test temperature of said selected external surface; and
using the measured test temperature as an independent variable to uniquely specify the steam flow through the valve at said reference condition.

25. The method of claim 24, wherein the step of applying a source of heat includes:
placing a plurality of closely spaced electric heating elements on the selected surface, and
insulating the heating elements from the ambient environment.

26. The method of claim 25, wherein the step of measuring the temperature includes attaching a thermocouple to the selected external surface.

27. The method of claim 26, wherein the step of using the measured temperature as an independent variable includes:
storing a quantitative relation between steam flow rate and thermocouple temperature; and
determining the leak rate from the measured temperature and said quantitative relation.

28. The method of claim 26, wherein the step of applying a source of heat includes applying sufficient heat to raise the temperature of the selected surface to about 50° F. above the pipe reference condition temperature.

29. The method of claim 27, wherein the step of storing a quantitative relation is preceded by the steps of:
setting up a laboratory calibration test at said reference condition of pressure and temperature using a calibration pipe having equivalent size and material composition as said upstream portion, a source of heat for the pipe external surface, and a thermocouple attached to the calibration pipe,
establishing a flow of steam through the calibration pipe at a plurality of flow rates including zero,
measuring the pipe external temperature at each flow rate, and
recording a quantitative relation between the plurality of flow rates and the respective measured temperatures.

30. The method of claim 29, wherein the step of establishing a plurality of flow rates includes flow rates between zero and one percent of full flow for said isolation valve.

* * * * *